United States Patent [19]

Hibi et al.

[11] 3,808,356

[45] Apr. 30, 1974

[54] INDEXING MEANS FOR A SINGLE PICKUP TUBE COLOR CAMERA

[75] Inventors: Masao Hibi, Kodaira; Yoshizumi Eto, Hachioji, both of Japan

[73] Assignee: Hitachi, Ltd., Tokyo, Japan

[22] Filed: Nov. 14, 1972

[21] Appl. No.: 306,459

[30] Foreign Application Priority Data

Nov. 17, 1971 Japan ........................... 46-91511

[52] U.S. Cl. ........................................ 178/5.4 ST

[51] Int. Cl. ........................................ H04n 9/06

[58] Field of Search ............................... 178/5.4 ST

[56] References Cited

UNITED STATES PATENTS 3,730,977 5/1907 Larsen ........................... 178/5.4 ST

*Primary Examiner*—Robert L. Richardson
*Attorney, Agent, or Firm*—Craig and Antonelli

[57] ABSTRACT

In a single pickup tube color camera provided with one image pickup tube having a composite color filter consisting of three kinds of stripe filter units for selecting the red, green and blue components of the image of an object, a first group of transparent electrodes are attached to some of the stripe filter units while a second group of transparent electrodes are attached to the other of the stripe filter units, the first group of electrodes being connected together and the second group of electrodes being also connected together, so that the interconnection of the first group of electrodes and that of the second group of electrodes may be made on a single plain without having a cross point between the two interconnections.

4 Claims, 10 Drawing Figures

INDEXING MEANS FOR A SINGLE PICKUP TUBE COLOR CAMERA

BACKGROUND OF THE INVENTION

1. Field of the Invention

The present invention relates to a single pickup tube color camera, and more particularly to a color camera which employs a color filter comprising a plurality of stripe filter units adapted to obtain red, green and blue light components and which can deliver the video signal and the reference signal, separately.

2. Description of the Prior Art

As is well known, three kinds of signals are essential in a color television system, which correspond to the red (R), green (G) and blue (B) components of the light emanating from an object. The color camera most widely used today is one in which such three signals are separately derived through three image pickup tubes. The size of such a camera is necessarily large since three image pickup tubes are essential. Moreover, the optical system for color decomposition and the deflecting system used in the camera must have a high accuracy since the three signals have to be simultaneously derived through the three image pickup tubes from a spot contributing to the image of an object.

In order to eliminate such difficulties regarding the size and precision as suffered by the camera using three image pickup tubes, there has been used a single pickup tube color camera which employs an image pickup tube having a color filter consisting of three kinds of stripe filter units from which the above mentioned three signals are simultaneously derived.

However, the fabrication of the conventional single pickup tube color camera is difficult and, moreover, the camera must be supplied with bias light having a constant level so as to obtain a stable black level. In addition to these drawbacks, the prior art camera has other difficulties, as will be mentioned later.

SUMMARY OF THE INVENTION

One object of the present invention is to provide a single pickup tube color camera which can be easily fabricated and which can operate with a high accuracy.

Another object of the present invention is to provide a single pickup tube color camera which can deliver a reference signal without the supply of a bias light.

In order to attain the above said object, the single pickup tube color camera according to the present invention employs a color filter consisting of three kinds of stripe filter units for red, green and blue light components; two kinds of transparent electrodes disposed on the rear surface of the color filter, one in contact with the red and green filter units and the other with the blue filter units, with the same kind of electrodes being commonly connected; and a photoconductive layer disposed on the transparent electrodes.

DESCRIPTION OF THE PREFERRED EMBODIMENTS

Figures 1, 2:
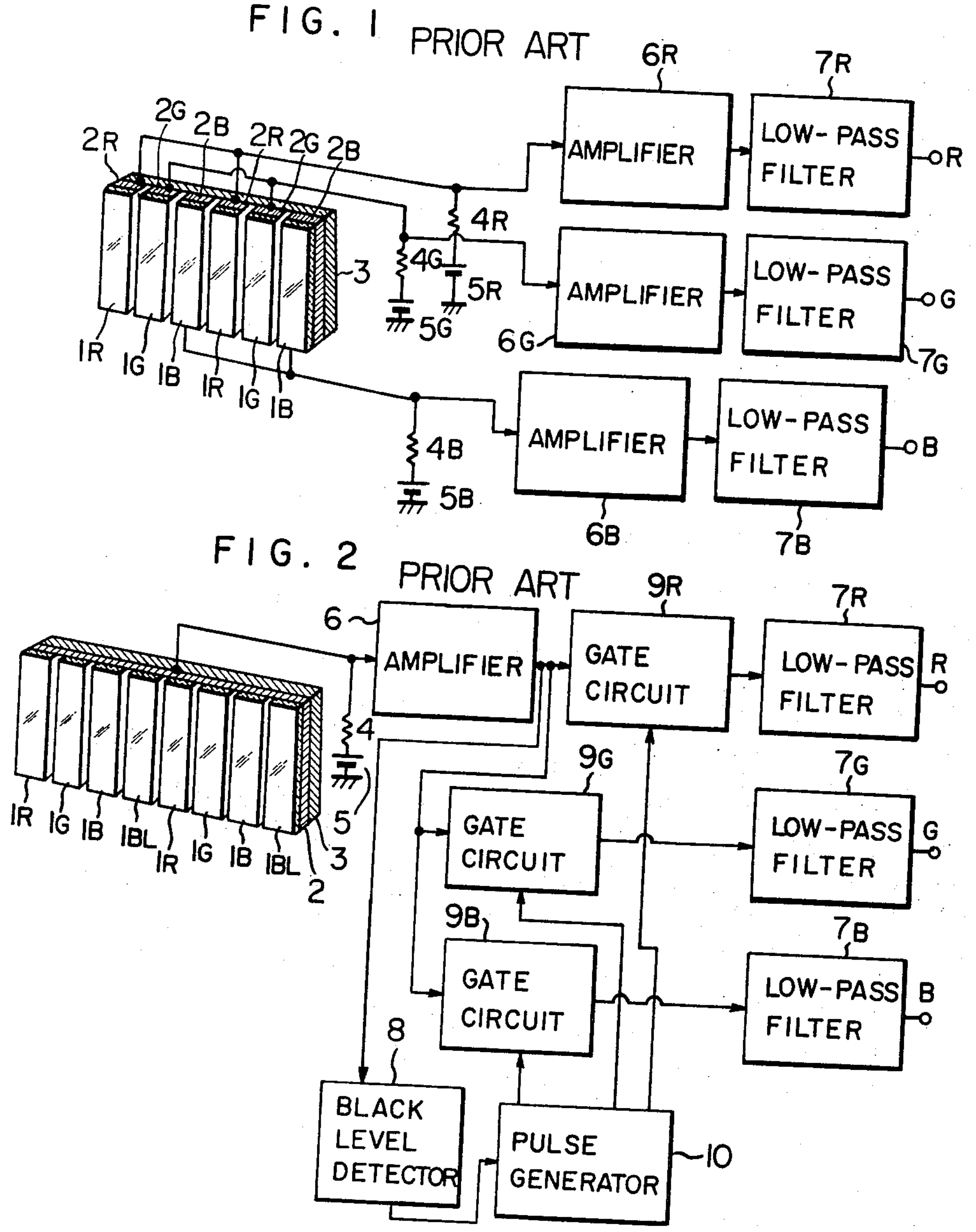
FIG. 1 PRIOR ART, FIG. 2 PRIOR ART
FIGS. 1 and 2 show the main parts of conventional single pickup tube color cameras.

FIG. 1 shows the main parts of a conventional single pickup tube color camera using a vidicon operating on the basis of a photoelectric effect as an image pickup tube. As seen in FIG. 1, on the rear surface of a composite color filter comprising stripe filter units 1R, 1G and 1B permeable respectively to red, green and blue light alone (hereafter often referred to as red, green and blue filters, respectively), are disposed transparent electrodes 2R, 2G and 2B corresponding respectively to the red, green and blue filters. A photoconductive layer 3 is disposed on the transparent electrodes 2R, 2G and 2B. The above mentioned parts are hermetically contained in a glass envelope and the surface of the photoconductive layer 3 is scanned by an electron beam (not shown). In FIG. 1, only two sets of red, green and blue filters 1R, 1G, 1B and 2R, 2G, 2B are shown for simplicity's sake, but in practice an arbitrary number of sets can be disposed according to the resolution required in the reproduced color picture, that is, for example, 300 sets for resolution of 300 lines/mm. The like filters are commonly connected; the red filters 2R are all connected together, so are the green and blue filters 2G and 2B. If the image of an object is formed by a lens system (not shown) on the red, green and blue filters 1R, 1G and 1B, with power sources 5R, 5G and 5B connected via load resistors 4R, 4G and 4B with the transparent electrodes 2R, 2G and 2B, respectively, then the video signals representative of red, green and blue components of the object can be derived at the load resistors 4R, 4G and 4B, respectively when the photoconductive layer 3 is scanned by the electron beam. The video signals are amplified through amplifiers 6R, 6G and 6B, and passed through low-pass filters 7R, 7G and 7B to obtain necessary video signals R, G and B. Such an image pickup tube as having the above described structure can be regarded as an ideal tri-color pickup tube, but the fabrication thereof is very difficult. Because, several hundred sets of transparent electrodes must be interconnected by suitable conductors in the image pickup tube and it is impossible to carry out the interconnection in a single plain without having the wirings of two different kinds of electrodes crossing each other since there are three kinds of electrodes. Therefore, it is impossible to perform the interconnection wirings through a flat wiring technique such as photoetching. This is one of difficulties encountered in the fabrication of the single pickup tube color camera in question. The resolution of the image pickup tube used in this color camera (determined mainly by the diameter of the scanning spot of the electron beam) becomes equal to the number of sets of stripe filter units 1R, 1G and 1B, and therefore the resolution of the reproduced color picture.

FIG. 2 shows the main parts of another conventional single pickup tube color camera. The composite color filter used in this camera has a plurality of stripe filter units opaque to visible lights, i.e. black filters 1BL, arranged among the red, green and blue filters 1R, 1G and 1B at a regular interval. A continuous transparent electrode 2 is disposed on the rear surface of the composite filter and a photoconductive layer 3 is formed on the transparent electrode 2. Now, if the image of an object is formed by means of lenses (not shown) on the stripe filter units 1R, 1G, 1B and 1BL with a power source 5 connected via load resistor 4 with the transparent electrode 2 while the photoconductive layer 3 is scanned by the electron beam, then a video signal is obtained through an amplifier 6. This video signal contains a periodical series of signals representative of the red, green and blue components of the object and a single representative of a black level independent of the object. Only the black level signal is then detected by a black level detector 8 and three gating pulses corresponding to the phases of the red, green and blue signals are generated by a pluse generator 10 on the basis of the detected black level signal. The gating pulses open gate circuits 9R, 9G and 9B to choose only the red, green and blue signals from the output of the amplifier 6. The chosen signals are then passed through low-pass filters 7R, 7G and 7B to obtain three video signals R, G and B. The single set of the composite color filter used in the image pickup tube in question comprises four kinds of stripe filter units, i.e. red, green, blue and black filters, as described above. Therefore, the width of a single stripe filter unit of the color filter used in this image pickup tube is smaller than the width of a single stripe filter unit of the color filter used in the color camera shown in FIG. 1; the former is three quarters of the latter. Hence, the fabrication of such a filter will become more difficult. Moreover, in order for the black level detector 8 to stably detect the black level signal, it is necessary for the image pickup tube to be capable of discriminating every stripe filter unit from another. In this case, therefore, the image pickup tube must have resolution four times as high as that required in the reproduced color picture which is the same as the resolution of the image pickup tube used in the color camera shown in FIG. 1. Further, in order to stably obtain the black level signal even when the object is rather dark, it is necessary to supply the pickup tube with a bias light having a constant level, independent of the object.

Figure 3:
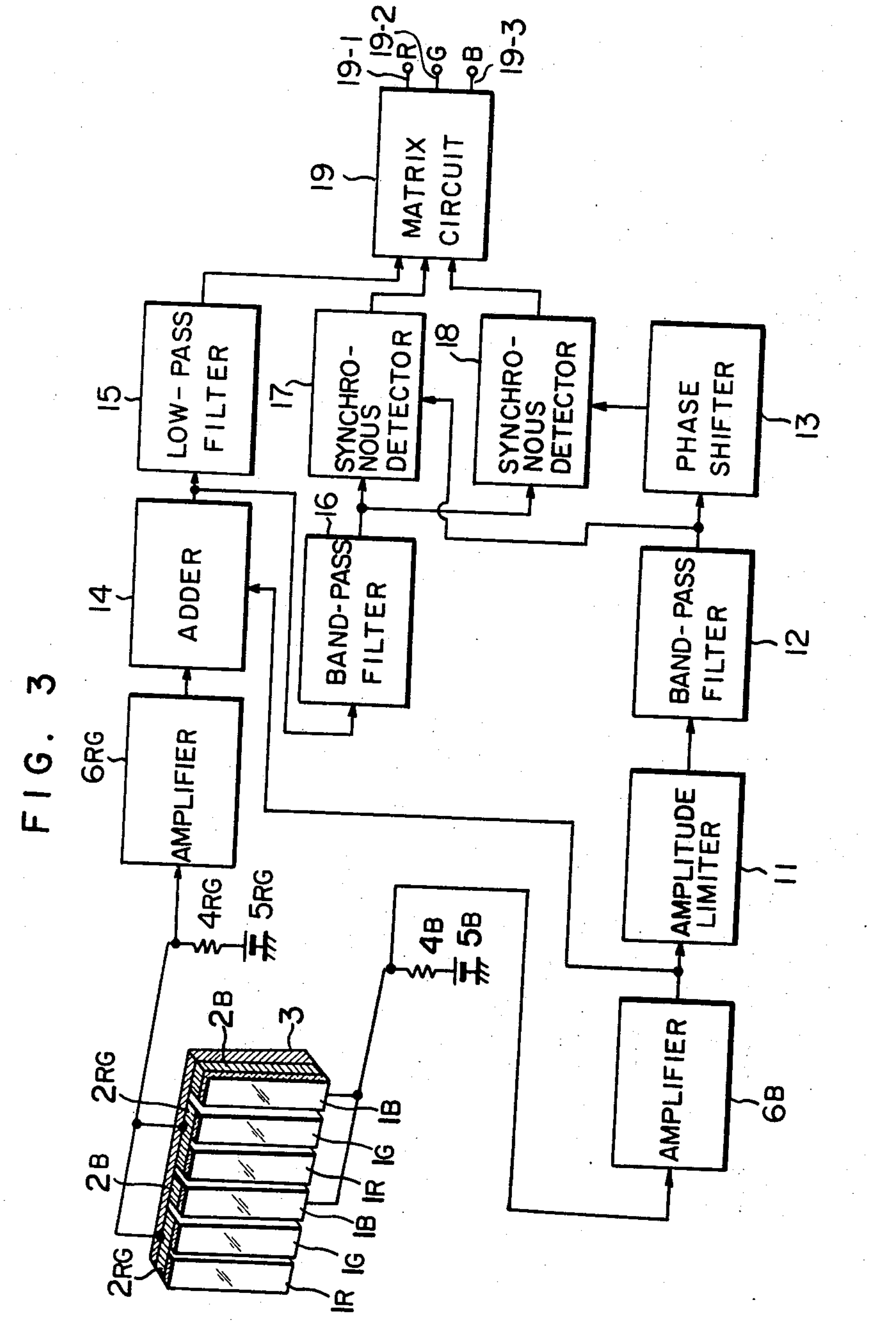
FIG. 3 shows the main parts of a single pickup tube color camera embodying the present invention.

FIG. 3 shows the main parts of a color camera embodying the present invention. The composite color filter used in the image pickup tube of this camera consists of three kinds of stripe filter units, i.e. red, green and blue filters. As shown in FIG. 3, transparent electrodes 2RG are disposed on the red and green filters 1R and 1G while transparent electrodes 2B are laid on the blue filter 1B. A photoconductive layer 3 is disposed on the transparent electrodes 2RG and 2B. The transparent electrodes 2RG are connected together and the transparent electrodes 2B are also commonly connected. Load resistors 4RG and 4B connect the transparent electrodes 2RG and 2B with power source 5RG and 5B. Amplifiers 6RG and 6B amplify the signals derived at the boad resistors 4RG and 4B and an adder 14 makes the sum of the outputs from the amplifier 6RG and 6B. And the other circuit components of the color camera are an amplitude limiter 11, a band-pass filter 12, a phase shifter 13, a low-pass filter 15, a band-pass filter 16, synchronous detectors 17 and 18 driven by the outputs of the band-pass filter 12 and the phase shifter 13 respectively, and a matrix circuit 19 receiving the outputs of the synchronous detectors 17 and 18 and of the low-pass filter 15 and having output terminals 19–1, 19–2 and 19–3.

Figure 4:
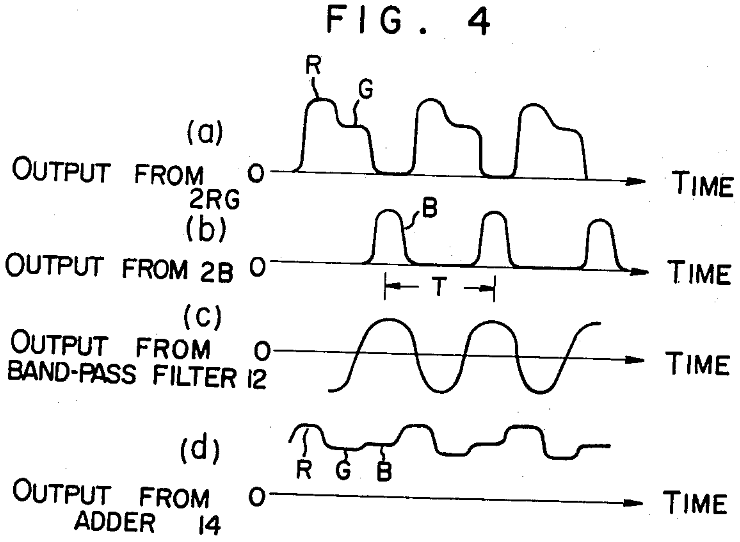
FIG. 4 shows waveforms useful for the explanation of the operation of the color camera shown in FIG. 3.

If, with this circuit arrangement as described above, the photoconductive layer 3 is scanned by an electron beam (not shown) while the image of an object is formed by means of a suitable optical system (not shown) on the composite color filter consisting of the red, green and blue filters 1R, 1G and 1B, then signals corresponding to the red and green components of the image (hereafter referred to as the red and green signal of the image, respectively) and a signal corresponding to the blue component of the image (hereafter referred to as the blue signal of the image) are derived respectively from the transparent electrodes 2RG and 2B. The waveforms (*a*) and (*b*) in FIG. 4 correspond respectively to the red and green signal consisting of red and green components R and G and the blue signal B. The output of the transparent electrodes 2RG contains an alternating series of the red and green signal components R and G while the output of the electrodes 2B has a succession of the blue component alone. It should here be noted that no output appears from the transparent electrodes 2RG when an output is being delivered from the electrodes 2B and vice versa. The output from the transparent electrodes 2B is amplified through the amplifier 6B, passed through the amplitude limiter 11 to have its amplitude rendered constant and passed through the band-pass filter 12 having the center frequency $W_c$ such that $$W_c = 2\pi / T \qquad (1)$$

with respect to the period $T$ of the output signal from the transparent electrodes 2B whose waveform (*b*) is shown in FIG. 4, so that a signal $P$ such that $$P = \cos W_c t \qquad (2)$$

is obtained, the waveform (*c*) of which is shown in FIG. 4. If the signal $P$ is then passed through the quadrature shifter 13, a signal $P'$ such that $$P' = \sin W_c t \qquad (3)$$

is obtained.

On the other hand, if the output signal from the transparent electrodes 2RG is amplified through the amplifier 6RG and then added through the adder 14 to the output of the amplifier 6B, a signal $S(t)$ such that $$S(t) = \frac{1}{3}\{R+G+B\} + \frac{2}{3}\sum_{n=1}^{\infty} \frac{\sin 1/3 n\pi}{1/3 n\pi}\left\{ R \cos W_c t + G \cos\left(W_c t - \frac{2}{3}\pi\right) + B \cos\left(W_c t - \frac{4}{3}\pi\right)\right\} \qquad (4)$$

is obtained, which is represented by the waveform (*d*) in FIG. 4. In a practical case, since the diameter of the scanning electron beam is not infinitely small, the signal $S(t)$ is limited in a certain band width. Thus, only a case where n of the expression (4) assumes unity alone, i.e. a case of $n=1$, should be considered.

The output $S(t)$ of the adder 14 is divided, through the low-pass filter 15 whose cut-off frequency is $W_c/2$ and the band-pass filter 16 whose center frequency is $W_c$, into two signals $S_L(t)$ and $S_H(t)$ such that $$S_L(t) = \tfrac{1}{3}\,(R + G + B) \qquad (5)$$

and $$S_H(t) = \sqrt{3}\,R\cos W_ct + G\cos(W_ct - \tfrac{2}{3}\pi) + B\cos(W_ct - 4/3\pi) \qquad (6)$$

If the output $S_H(t)$ of the band-pass filter 16 is detected respectively by the synchronous detectors 17 and 18 using the signals $P(t)$ and $P'(t)$, then the detected outputs $D_1$and $D_2$ are given by the following expressions $$D_1 = R - \tfrac{1}{2}\,(G + B) \qquad (7)$$

and $$D_2 = G - B \qquad (8)$$

where constant coefficients of $R$, $G$ or $B$ are omitted. The signals $S_L(t)$, $D_1$ and $D_2$ are finally fed to the matrix circuit 19 to perform calculations defined by the formulae $$R = S_L + \tfrac{2}{3}\,D_1 \qquad (9),$$

$$G = S_L - \tfrac{1}{3}\,D_1 + \tfrac{1}{2}\,D_2 \qquad (10),$$

and $$B = S_L - \tfrac{1}{3}\,D_1 - \tfrac{1}{2}\,D_2 \qquad (11)$$

Thus, the red, green and blue signals are derived at the output terminals 19–1, 19–2 and 19–3 of the matrix circuit 19.

Figure 5:
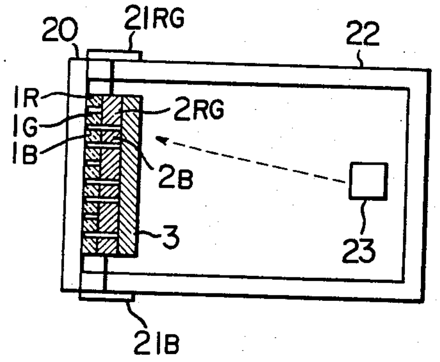
FIG. 5 shows in cross section the principal portion of the image pickup tube used in the single pickup tube color camera embodying the present invention.

FIG. 5 shows in cross section the principal portion of the image pickup tube used in a color camera as another embodiment of the present invention. In this figure, a composite color filter consisting of red, green and blue filters 1R, 1G and 1B, transparent electrodes 2RG and 2B, and a photoconductive layer 3, all similar to those as shown in FIG. 3, are arranged in rear of a transparent face plate 20. The composite color filter and the transparent electrodes can be formed into the shape as shown in FIG. 5 through photoetching technique. Namely, the transparent electrodes 2RG and 2B are formed into a pair of interleaved comb-like structures, as shown in a front view in FIG. 6, which can be laid on a single plane. Thus, the interconnection of the same kind of electrodes can also be made in the same plane. Target ring disposed along the periphery of the envelope 22 of the image pickup tube is split into two parts 21RG and 21B to which the transparent electrodes 2RG and 2B are respectively coupled. From the target rings 21RG and 21B are derived signals as represented by the waveforms (*a*) and (*b*) shown in FIG. 4. A deflecting means for changing the direction of the electron beam emitted from an electron gun, togather with the electron gun is represented by a block 23. The evacuated envelope 22 hermetically contains all the parts.

Figure 7:
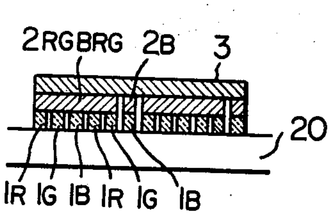
FIG. 7 shows in cross section the principal portion of an image pickup tube used in a color camera as another embodiment of the present invention.

With the single pickup tube color camera having such a structure as described above, the resolution can be much improved in comparison with the conventional color camera shown in FIG. 2. Namely, it is known that in the transmission of color pictures, the band width $\Delta f$ required for the chrominance signal may be about one-fifth to one-tenth of that required for the luminance signal. Moreover, the band width of the signal $D_1$ or $D_2$, each contributing to the chrominance signal, may be $\Delta f$ since the signal $S_L(t)$ is used as a luminance signal in the expressions (9), (10) and (11). On the other hand, the pass-band width of the filter 16 is $f_c \pm \Delta f$ while the resolution of the image pickup tube is at best $f_c + \Delta f$, where $W_c = 2f_c$. The resolution $f_c + \Delta f$ will be 4.5 (MHz) if the band width $f_c/2$ of the signal $S_L(t)$ which determines the resolution of the reproduced color picture is 2MHz and $\Delta f$ is 0.5 (MHz). Therefore, the image pickup tube may have a resolution 2.25 times as high as that of the reproduced picture. The resolution of the image pickup tube used in the conventional color camera shown in FIG. 2 was, as decribed above, must be four times that of the reproduced picture. Thus, it is seen that the image pickup tube according to the present invention contributes much to the facilitation of the fabrication of a high resolution color camera. In the above description, the red and green filters 1R and 1G are furnished with the transparent electrodes 2RG to be connected together while the transparent electrodes 2B are attached to the blue filters 1B alone. However, the part of the red filter and that of the blue one or the part of the green filter and that of the blue one are interchangeable. The way of disposition of the transparent electrodes is not limited to these hitherto described. For example, a continuous transparent electrode 2RGBRG may be disposed on one set of stripe filter units 1R, 1G and 1B on the red and green filters 1R and 1G of the adjacent set, as seen in FIG. 7, with the blue filter of the adjacent set furnished with a transparent electrode 2B. In this case, the period of appearance of the electrodes 2B is twice the period T of the waveform (*b*) in FIG. 4. Accordingly, the center frequency of the band-pass filter 12 which is to receive the output from the electrode 2RGBRG, is $f_c/2$ and the band-pass filter 12 must be directly followed by an additional frequency doubler to produce a signal having a frequency of $f_c$ when the successive signal processing is performed by the circuit shown in FIG. 3. Here, the width of the transparent electrode 2RGBRG is greater than that of the electrode 2RG shown in FIG. 5 and therefore the resistance of the electrode is smaller so that the output is increased. This is one of the advantages of this electrode arrangement.

Figure 8:
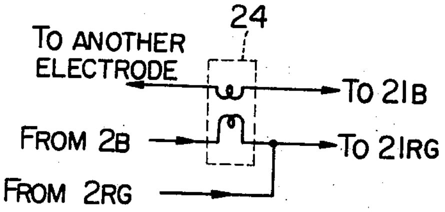
FIG. 8 is the principal portion of the image pickup tube in a color camera as another embodiment of the present invention.
Figure 9:
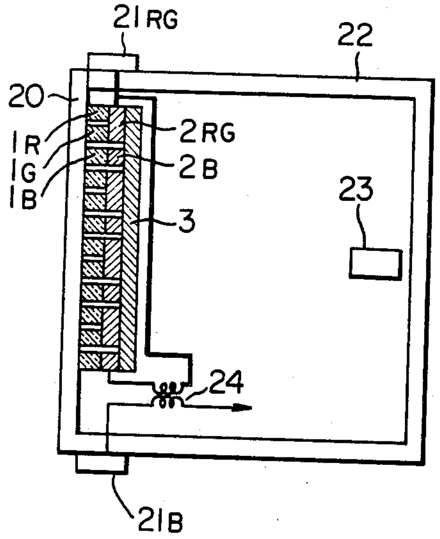

Further, in the embodiment shown in FIG. 3, the outputs from the transparent electrodes 2RG and 2B are amplified and then added up together through the adder 14. According to the present invention, however, the function of the adder 14 can be possessed by the pickup tube itself. This can be realized, as shown in FIG. 9, merely by incorporating a transformer 24 as shown in FIG. 8 in the pickup tube. The ends of the primary winding of the transformer 24 are connected with the transparent electrodes 2RG and 2B and that end of the primary winding which is connected with the electrodes 2RG is further coupled to the target ring 21RG. One end of the secondary winding of the transformer 24 is equivalently grounded by being connected with an electrode such as the forcussing electrode of the image pickup tube and the other end of the secondary winding is coupled to the target ring 21B. By doing this, the output signal $S(t)$ which is equal to the output of the adder 14 can be derived from the target ring 21RG. And the target ring 21B delivers the output signal which is represented by the waveform (*b*) in FIG. 4. The use of such a transformer, therefore, provides a merit that the adder 14 used in the circuit shown in FIG. 3 can be eliminated.

Figure 10:
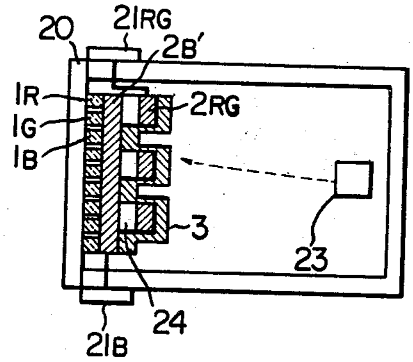
FIGS. 9 and 10 show in cross section image pickup tubes used in color camera as further embodiments of the present invention.

Furthermore, in the above described embodiments, the transparent electrodes are in the form of stripe. However, the transparent electrodes may be replaced by a structure as shown in FIG. 10 in which the same reference numerals or characters have been applied to like parts or elements. In FIG. 10, a continuous transparent electrode 2B' covers all the red, green and blue filters, and a plurality of stripes of transparent insulating layer (for example, of $SiO_2$) 24 and the same number of stripe transparent electrodes 2RG are disposed on the continuous transparent electrode 2B' in this order. A photoconductive layer 3 is disposed on the stripe transparent electrodes 2RG and the exposed parts of the continuous electrode 2B'. In this case, the signals derived from the taget rings 21RG and 21B are the same as those obtained with the color camera as shown in FIG. 5. Namely, the red and green signals R and G are obtained when the electron beam hits that part of the photoconductive layer 3 under which the electrode 2RG is laid while otherwise the blue signal B is derived. Moreover, the area of the electrode 2B' is rather large and it is not only easy of fabrication but also possesses smaller resistance which assures a signal from the target ring 21B greater than that obtained with the structure shown in FIG. 5. This is also an advantage of this embodiment.

The red, green and blue filters 1R, 1G and 1B used in the image pickup tube are the media permeable to red, green and blue lights, respectively, but it is easily understood that they can be replaced by the media reflecting the red, green and blue lights respectively.

The summary of the above described features and merits of the single pickup tube color camera according to the present invention is as follows.

Figure 6:
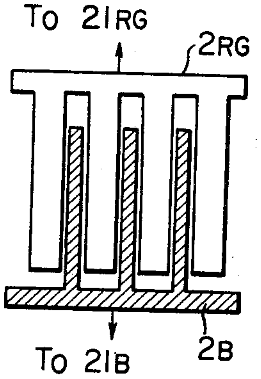
FIG. 6 shows in detail the principal portion of the image pickup tube in the color camera embodying the present invention.

1. Two kinds of transparent electrodes are used in comparison with a conventional color camera as shown in FIG. 1 so that the interconnections of the two kinds of electrodes can be easily performed as shown in FIG. 6 without having the interconnections crossing each other.

2. Each stripe filter unit has a width equal to four-thirds of that of a single stripe filter unit used in a conventional color camera as shown in FIG. 2. Therefore, the fabrication of the filter units is facilitated. Moreover, the resolution of the image pickup tube can be about half that of the conventional image pickup tube. Furthermore, a bias light is not necessarily needed in order to stabilize the output from the target ring as shown in FIG. 5 when the object is dark. For example, a certain amount of dark current has only to be flown through the image pickup tube.

In addition to these, the color camera according to the present invention has the general features and merits of a phase separation type single pickup tube color camera in which three color signals are arranged at the same period. Such features and merits are as follows.

1. The simultaneous signals representative of three primary colors can be easily obtained and that without the misregistration of the signals.

2. The non-uniformity of the sensitivity of the image pickup tube and the non-linearity of the output current of the tube in response to the incident light cause no hue distortion so that an excellent reproducibility of color is attained.

Thus, according to the present invention, a single pickup tube color camera can be obtained which is easy of fabrication and can produce pictures of high quality.

What we claim is:

1. A single pickup tube color camera comprising a transparent face plate; a composite color filter consisting of three kinds of stripe filter units disposed periodically on said face plate, said three kinds of stripe filter units being permeable to different color lights; a first and a second groups of transparent electrodes disposed periodically on said composite filter, the ratio of the period of either of said first and second electrode groups to that of said stripe filter units being an integer; a photoelectric transducing layer disposed on said first and second groups of transparent electrodes; a first means for generating an electron beam to scan said photoelectric transducing layer in the direction perpendicular to said stripe filter units; a second means for deriving from said first group of transparent electrodes a periodical signal corresponding to the light having passed through one kind of said stripe filter units; a third means for deriving from said second group of transparent electrodes a periodical signal corresponding to the light having passed through the other kind of said stripe filter units; and a fourth means for making the sum of said periodical signals obtained from said first and second groups of transparent electrodes; wherein a video signal representative of the image of an object and containing a periodical series of signals corresponding to said different color lights, is derived from said fourth means and said periodical signal from said first group of transparent electrodes serves as a reference signal, the ratio of the period of said reference signal to that of said video signal being an integer.

2. A single pickup tube color camera as claimed in claim 1, wherein said first group of electrodes are replaced by an electrode disposed uniformly within the range of the excursion of the spot of the electron beam while said second group of electrodes are electrodes disposed periodically on said uniformly disposed electrode with transparent insulating layer interposed therebetween, the ratio of the period of said electrodes to that of said stripe filter units being an integer.

3. A single pickup tube color camera as claimed in claim 1, wherein said fourth means is a transformer having a prineary winding and a secondary winding, the ends of said primary winding being connected respectively with said first and second groups of electrodes, one end of said secondary winding being equivalently grounded and said reference signal being obtained from the other end of said secondary winding, and wherein said video signal is obtained from the terminal of said primary winding.

4. A single pickup tube color camera as claimed in claim 1, wherein said first and second electrodes are a pair of interleaved comb-like structures.

* * * * *